United States Patent [19]
Lockett

[11] 3,939,595
[45] Feb. 24, 1976

[54] SINKER RELEASE MEANS

[76] Inventor: Neal R. Lockett, 3701 SW. 105th, Seattle, Wash. 98146

[22] Filed: May 7, 1975

[21] Appl. No.: 571,713

[52] U.S. Cl. ............................................. 43/43.12
[51] Int. Cl.² ........................................ A01K 91/00
[58] Field of Search ....................... 43/43.12, 43.13

[56] References Cited
UNITED STATES PATENTS

| | | | |
|---|---|---|---|
| 2,735,212 | 2/1956 | Baum | 43/43.12 |
| 2,841,911 | 7/1958 | Dahlgren | 43/43.12 |
| 3,057,108 | 10/1962 | Jacobsen | 43/43.12 |
| 3,217,443 | 11/1965 | Goodman | 43/43.12 |

Primary Examiner—Warner H. Camp
Attorney, Agent, or Firm—James D. Givnan, Jr.

[57] ABSTRACT

Release means providing separation of a fishing sinker from remaining fishing gear upon a fish strike. A wire member engages, at its forward end, first and second eyelets of a fishing line attachment. Disposed between the eyelets and supported by the forward end of the wire member is a sinker line. Tensioning of the wire member during a fish strike, results in partial retraction of the wire member through the eyelets to release the sinker line. The wire member is of looped configuration and shaped so as to retain its position relative to the eyelets against all forces exerted thereon other than a tensioning force resulting from a fish strike. A modified form of wire member is reinforced intermediate its ends.

10 Claims, 4 Drawing Figures

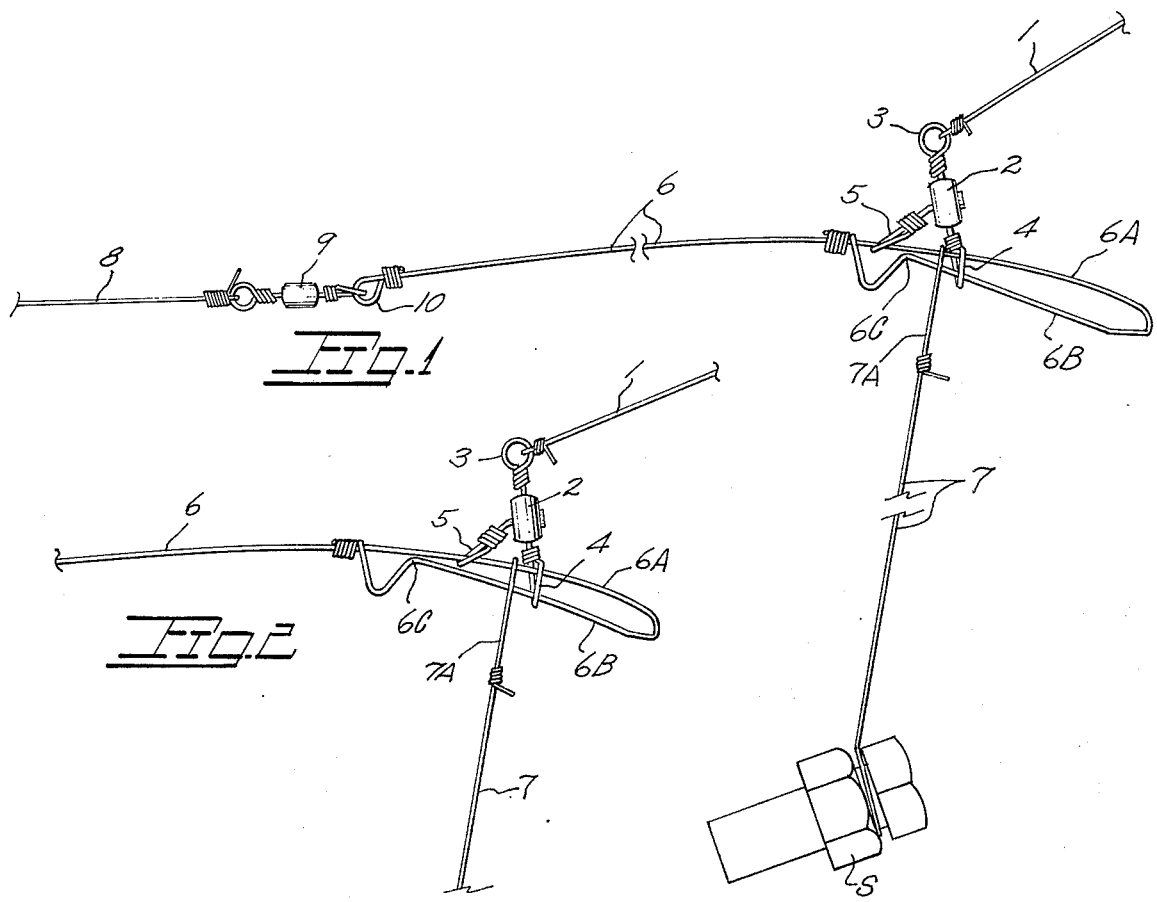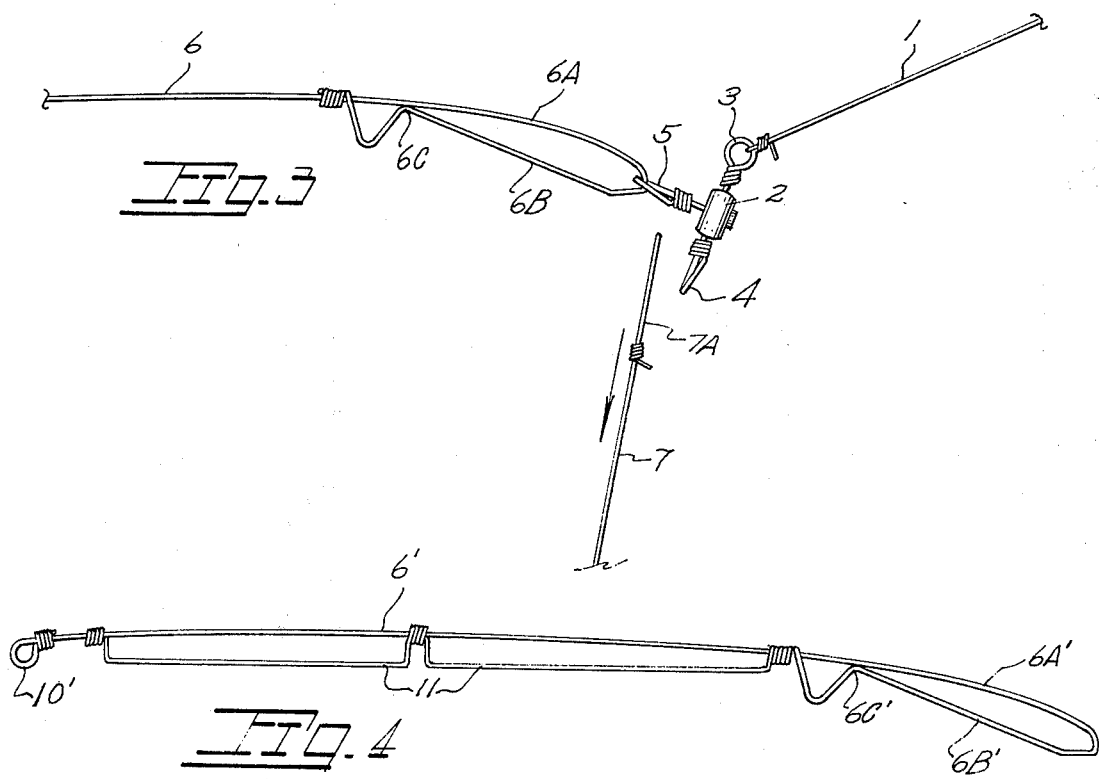

SINKER RELEASE MEANS

BACKGROUND OF THE INVENTION

The present invention relates generally to fishing gear and specifically to gear incorporating means for sinker release upon a fish strike.

Known in the prior art are various types of fishing gear which provide for sinker release upon sudden tensioning of the fishing line or leader. The primary advantage of such arrangements is that the ensuing contest with the fish is not detracted from by the weight of a sinker. Examples of fishing gear providing for release of a submerged sinker are found in the following U.S. Pat. Nos. 3,081,574; 3,195,262; 3,218,751; and 3,605,319.

To the extent of present knowledge, none of the prior art arrangements are currently in wide use for one reason or another. Certain drawbacks are noted in one or more of the prior art arrangements, such drawbacks including the requirement that the sinker be of a specific configuration necessitating costly molding operations; the release means for the sinker is incapable of withstanding severe dynamic forces encountered in casting of a lure; complex wire configurations susceptible to snagging underwater obstructions or entanglement with the line as well as being costly to manufacture.

SUMMARY OF THE INVENTION

The present invention is embodied within sinker release means including a fishing line attachment and a wire member which cooperate to retain a sinker until a fish strike, at which time relative movement between the line attachment and wire member serves to release the sinker.

Most sportsmen consider it highly desirable that the playing of a hooked fish be unhindered by sinker weight both for reasons of enjoyment as well as to avoid possible overstressing of the fishing gear. A configured wire member of the present arrangement in combination with a line attachment, shown as a three-way swivel, serve to releaseably attach a sinker line. The wire member is uniquely shaped so as to retain the fishing line attachment and the sinker attaching line against lengthwise movement along the wire member until a strike at which time the flexible nature of the wire permits shifting of the attachment therealong for sinker release. Conversely, in instances where the sinker is snagged on an underwater obstruction, the fishing line may be tensioned for sinker unsnagging purposes. In instances where the sinker cannot be unsnagged, the use of a lighter test sinker line will permit sinker separation to permit subsequent retrieval of the remaining fishing gear.

Important objects of the present invention fishing gear include the provision of: release means for a sinker actuated by the strike of a fish; release means operable in two stages to prevent undesired release when the lure is only "mouthed" by the fish; release means utilizing low cost components one of which is uniquely configured to accomplish present purposes; release means usable both with scrap metal weights as well as with costlier conventional lead weights; release means equally suitable for use in trolling, casting and still fishing in various bodies of water for a wide variety of game fish; release means permitting the fisherman to exert severe forces on the fishing line during sinker unsnagging efforts.

BRIEF DESCRIPTION OF THE DRAWING

In the accompanying drawing:

FIG. 1 is a side elevational view of the present release means shown in sinker retaining configuration, FIG. 2 is a view similar to FIG. 1 subsequent to a fish strike but prior to sinker release, FIG. 3 is a view similar to FIGS. 1 and 2 with sinker release being accomplished by partial disengagement of a line attachment from a wire component, and FIG. 4 is a side elevational view of a modified form of the wire member.

DESCRIPTION OF THE PREFERRED EMBODIMENT

With continuing reference to the accompanying drawing wherein applied reference numerals indicate parts similarly identified in the following specification, the reference numeral 1 indicates a fishing line which may be of any type and test best suited to the type of fishing. Line 1 may be considered either a trolling line or a casting line as the present invention is equally adaptable to all conventional types of sport fishing.

Indicated at 2 is a line attachment shown as a three-way swivel of the barrel type having one eyelet at 3 in attachment with line 1. Remaining eyelets 4 and 5, hereinafter termed first and second eyelets, are in engagement with the forward portion of a flexible wire member 6. Wire member 6 is normally less than one foot in length and terminates rearwardly in an eye 10 to receive a leader 8 with attachment being via a two-eye, barrel swivel 9. A leader 8, at its unseen end, is attached to a lure or bait with the length, test, lure and bait all being determined, of course, by the type of fishing being done.

With further attention to wire member 6, the forward portion comprises loop runs at 6A and 6B constituting a loop configuration. The transverse dimension of the loop configuration is somewhat greater than the inner diameter of first eyelet 4 for purposes later elaborated. The loop is closed intermediate its ends by bend 6C in close proximity to loop run 6A such closure constituting a yieldable stop for second eyelet 5. Passage of eyelet 5 past said closure at 6C takes place only upon a sudden pull on wire 6 such as that exerted by a striking fish.

Sinker attachment means in the form of a sinker line is indicated at 7, looped at 7A to releaseably attach a sinker S. With attention to FIG. 2, sinker line 7 normally remains in place on wire 6 trapped intermediate eyelets 4 and 5. Travel of said loop configuration rearwardly through eyelets 4 and 5 occurs during a fish strike. Such travel of the loop configuration is initially resisted by the constraining action of closure 6C. Subsequent resistance is by reason of the transverse loop dimension being such to resist passage of first eyelet 4. Should the fish not remain hooked after the initial strike, sinker line 7 will not be released as per the FIG. 2 position. Assuming the fish remains hooked, further resistance by the fish causes the wire loop to eventually be withdrawn entirely from first eyelet 4 at which time sinker line loop 7A is released as per the FIG. 3 view. With the sinker line released, the action of the fish, as aforesaid, will be unencumbered and further the tackle and gear will not be subject to the added stress of the sinker weight.

In instances where the sinker S is snagged, a strong pull may be exerted for dislodgement purposes by reason of the pull forces being transmitted, substantially in a straight line, through line attachment 2, eyelet 4 thereof and sinker attachment line 7 with relative movement between wire member 6 and said attachment line.

In FIG. 4 I show a modified form of wire member wherein like components are identified by prime reference numerals. A reinforcing wire member 11 extends in substantially parallel relationship to main wire member 6' to contribute added rigidity to said main wire member. This latter form of the wire member is particularly suited to resist bending loads encountered during casting of a lure.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. Sinker release means for fishing gear, said means including,
    an attachment for securement to a fishing line, said attachment including first and second eyelets,
    a flexible wire member interconnecting said line attachment with a length of leader ahead of a lure, said wire member of elongate loop configuration adjacent its forward end and thereat engaged with said eyelets and adapted to detachably support sinker attachment means, and
    said first and second eyelets normally confining said sinker attachment means on said wire member, said wire member displaceable rearwardly relative to said eyelets upon a fish striking the lure whereby said sinker attachment means is released from said wire member.

2. The sinker release means claimed in claim 1 wherein said second eyelet passes through said loop configuration.

3. The sinker release means claimed in claim 2 wherein said second eyelet normally retains said wire member in place by contact with a closed portion of the loop, said closed portion of the loop yieldable upon a force being exerted lengthwise on said wire member during a fish strike to permit retraction of said wire member through the eyelets to release said sinker attachment means.

4. The sinker release means claimed in claim 3 wherein said first eyelet encompasses said loop configuration of the wire member.

5. The sinker release means claimed in claim 4 wherein said loop configuration is of a greater transverse dimension than the inside diameter of said first eyelet whereby the first eyelet yieldably resists rearward retraction of said wire member during a fish strike.

6. The sinker release means claimed in claim 1 wherein said line attachment is a three-way swivel.

7. The sinker release means claimed in claim 6 wherein said elongate loop configuration includes an intermediate closed portion, said first and second eyelets normally disposed on opposite sides of said closed portion.

8. The sinker release means claimed in claim 7 wherein said second eyelet is slidably entrained on one run of the elongate loop configuration and is normally in restraining contact with said closed portion of the loop configuration to hold the wire member against all forces exerted thereon other than those resulting from a fish strike.

9. The sinker release means claimed in claim 8 wherein said first eyelet extends transversely about said loop configuration of the wire member.

10. The sinker release means claimed in claim 9 wherein said loop configuration is of a greater transverse dimension than the inside diameter of said first eyelet whereby the first eyelet yieldably resists rearward retraction of said wire member during a fish strike.

* * * * *